(12) United States Patent
Nakamura

(10) Patent No.: US 7,976,420 B2
(45) Date of Patent: Jul. 12, 2011

(54) ECCENTRIC OSCILLATING TYPE SPEED REDUCER

(75) Inventor: Koji Nakamura, Tsu (JP)

(73) Assignee: Nabtesco Corporation, Tokyo (JP)

( * ) Notice: Subject to any disclaimer, the term of this patent is extended or adjusted under 35 U.S.C. 154(b) by 375 days.

(21) Appl. No.: 12/160,820

(22) PCT Filed: Jan. 12, 2007

(86) PCT No.: PCT/JP2007/050357
§ 371 (c)(1),
(2), (4) Date: Jan. 8, 2009

(87) PCT Pub. No.: WO2007/080987
PCT Pub. Date: Jul. 19, 2007

(65) Prior Publication Data
US 2011/0077117 A1    Mar. 31, 2011

(30) Foreign Application Priority Data

Jan. 13, 2006  (JP) ................. 2006-005619

(51) Int. Cl.
*F16H 57/04*    (2010.01)
*F16H 1/32*    (2006.01)

(52) U.S. Cl. ....................... 475/161; 475/162

(58) Field of Classification Search .................. 475/161, 475/162
See application file for complete search history.

(56) References Cited

U.S. PATENT DOCUMENTS

| 7,070,533 B2 * | 7/2006 | Tsurumi et al. ............... 475/168 |
| 2002/0077209 A1 * | 6/2002 | El-Antably et al. .......... 475/159 |
| 2003/0054912 A1 | 3/2003 | Nohara et al. |
| 2004/0192486 A1 | 9/2004 | Tsurumi et al. |

FOREIGN PATENT DOCUMENTS

CN    1409029 A    4/2003
(Continued)

OTHER PUBLICATIONS

Office Action Issued Oct. 8, 2010 in Chinese Appln. Ser. No. 200780003130.9.

*Primary Examiner* — Edwin A Young
(74) *Attorney, Agent, or Firm* — Panitch Schwarze Belisario & Nadel LLP

(57) ABSTRACT

The present invention provides an eccentric oscillating type speed reducer that can more effectively be cooled with an extremely simple structure.

An eccentric oscillating type speed reducer 1 includes a camshaft 11 having crank portions 11a and 11b, a plurality of externally toothed gear members 12 that respectively have holes, each of which accommodates an associated one of the crank portions, and that are eccentrically moved by rotation of the camshaft, an internally toothed gear member 13 having an inner peripheral surface in which internal teeth to be meshed with external teeth formed on external peripheral surfaces of the externally toothed gear members are formed so as to set the number of the internal teeth to be slightly larger than that of external teeth, and support members 14 respectively positioned at both ends of the externally toothed gear members so as to rotatably support both ends of the camshaft. Further, support members 18 and 19 are integrally coupled to each other via a pillar portion 17. In the eccentric oscillating type speed reducer 1, a coolant passage 30 passing through the integrally coupled support members 18 and 10, and the pillar portion 17 is provided. A coolant, such as cooling water or cooling air, is passed through the coolant passage. Consequently, the eccentric oscillating type speed reducer can efficiently be cooled.

2 Claims, 2 Drawing Sheets

FOREIGN PATENT DOCUMENTS

| | | |
|---|---|---|
| JP | 47-005615 A | 3/1972 |
| JP | 57-171499 | 10/1982 |
| JP | 10-230491 | 9/1998 |
| JP | 10-263843 | 10/1998 |
| JP | 2004-084920 A | 3/2004 |
| JP | 2005-153047 A | 6/2005 |

\* cited by examiner

ECCENTRIC OSCILLATING TYPE SPEED REDUCER

TECHNICAL FIELD

The present invention relates to an eccentric oscillating type speed reducer and, in particular, to an eccentric oscillating speed reducer for use in a spot gun robot. More particularly, the invention relates to an improvement of an eccentric oscillating speed reducer which includes a camshaft having crank portions, a plurality of externally toothed gear members that respectively have holes, each of which accommodates an associated one of the crank portions, and that are eccentrically moved by rotation of the camshaft, an internally toothed gear member having an inner peripheral surface in which internal teeth to be meshed with external teeth formed on external peripheral surfaces of the externally toothed gear members are formed so as to set the number of the internal teeth to be slightly larger than that of external teeth, and support members respectively positioned at both ends of the externally toothed gear members so as to rotatably support both ends of the camshaft, so that support members are integrally coupled to each other via a pillar portion.

BACKGROUND ART

An eccentric oscillating type speed reducer having the aforementioned configuration can achieve a high speed reduction ratio and are widely employed in various technical fields (see, e.g., Patent Document 1). Moreover, the eccentric oscillating type speed reducer having the aforementioned configuration is employed in a drive portion of each industrial robot, such as a spot gun robot.

Patent Document 1: JP-A-2004-84920

DISCLOSURE OF THE INVENTION

Problems that the Invention is to Solve

Such an eccentric oscillating type speed reducer can achieve a large speed reduction ratio. However, the speed reducer generates heats by applying an excessive load thereto. Reducing a load to be applied to the speed reducer, and increasing the capacity of the speed reducer are countermeasures generally employed to prevent the speed reducer from generating heat. Any such countermeasures lead to increase in the cost of the speed reducer. On the other hand, in a case where the speed reducer is cooled, at most, the periphery of the speed reducer is air-cooled.

In view of such background art, the invention aims at providing an eccentric oscillating type speed reducer that can more effectively be cooled with an extremely simple structure.

Means for Solving the Problems

The invention achieves the foregoing object by providing an eccentric oscillating speed reducer which includes a camshaft having crank portions, a plurality of externally toothed gear members that respectively have holes, each of which accommodates an associated one of the crank portions, and that are eccentrically moved by rotation of the camshaft, an internally toothed gear member having an inner peripheral surface in which internal teeth to be meshed with external teeth formed on external peripheral surfaces of the externally toothed gear members are formed so as to set the number of the internal teeth to be slightly larger than that of external teeth, and support members respectively positioned at both ends of the externally toothed gear members so as to rotatably support both ends of the camshaft so that the support members are integrally coupled to each other via a pillar portion. In the eccentric oscillating speed reducer, a coolant passage passing through the integrally coupled support members and through the pillar portion is provided.

Particularly, in a case where an eccentric oscillating type speed reducer according to the invention is applied to a spot gun robot, the eccentric oscillating type speed reducer can be configured to include a camshaft having crank portions, a plurality of externally toothed gear members that respectively have holes, each of which accommodates an associated one of the crank portions, and that are eccentrically moved by rotation of the camshaft, an internally toothed gear member having an inner peripheral surface in which internal teeth to be meshed with external teeth formed on external peripheral surfaces of the externally toothed gear members are formed so as to set the number of the internal teeth to be slightly larger than that of external teeth, and support members respectively positioned at both ends of the externally toothed gear members so as to rotatably support both ends of the camshaft so that the support members are integrally coupled to each other via a pillar portion, that a coolant passage passing through the integrally coupled support members and through the pillar portion is provided, and that a coolant for cooling a spot gun is passed therethrough. With this configuration, the eccentric oscillating type speed reducer can effectively be cooled using a coolant, such as cooling water, used for cooling in a spot gun during spot welding.

Advantages of the Invention

According to the invention, the eccentric oscillating type speed reducer can efficiently be cooled by providing a coolant passage, which penetrates through the integrally coupled support members and through the pillar portion, and passing a coolant, such as cooling water or cooling air, therethrough. Consequently, even in a case where a speed reducer having the same capacity as that of the conventional one, a load applied to the reducer can be increased, as compared with that applied to the conventional one. Thus, the speed reducer can be operated at further lower cost.

In this case, when a plurality of eccentric oscillating type speed reducers are used in parallel in a spot gun robot or the like, piping can be series-connected so that a coolant, such as cooling water or cooling air, is serially supplied to the plurality of eccentric oscillating type speed reducers. Alternatively, piping can be configured to circulate a coolant, such as cooling water or cooling air, therethrough so as to cool one eccentric oscillating type speed reducer.

BEST MODE FOR CARRYING OUT THE INVENTION

Figure 1:
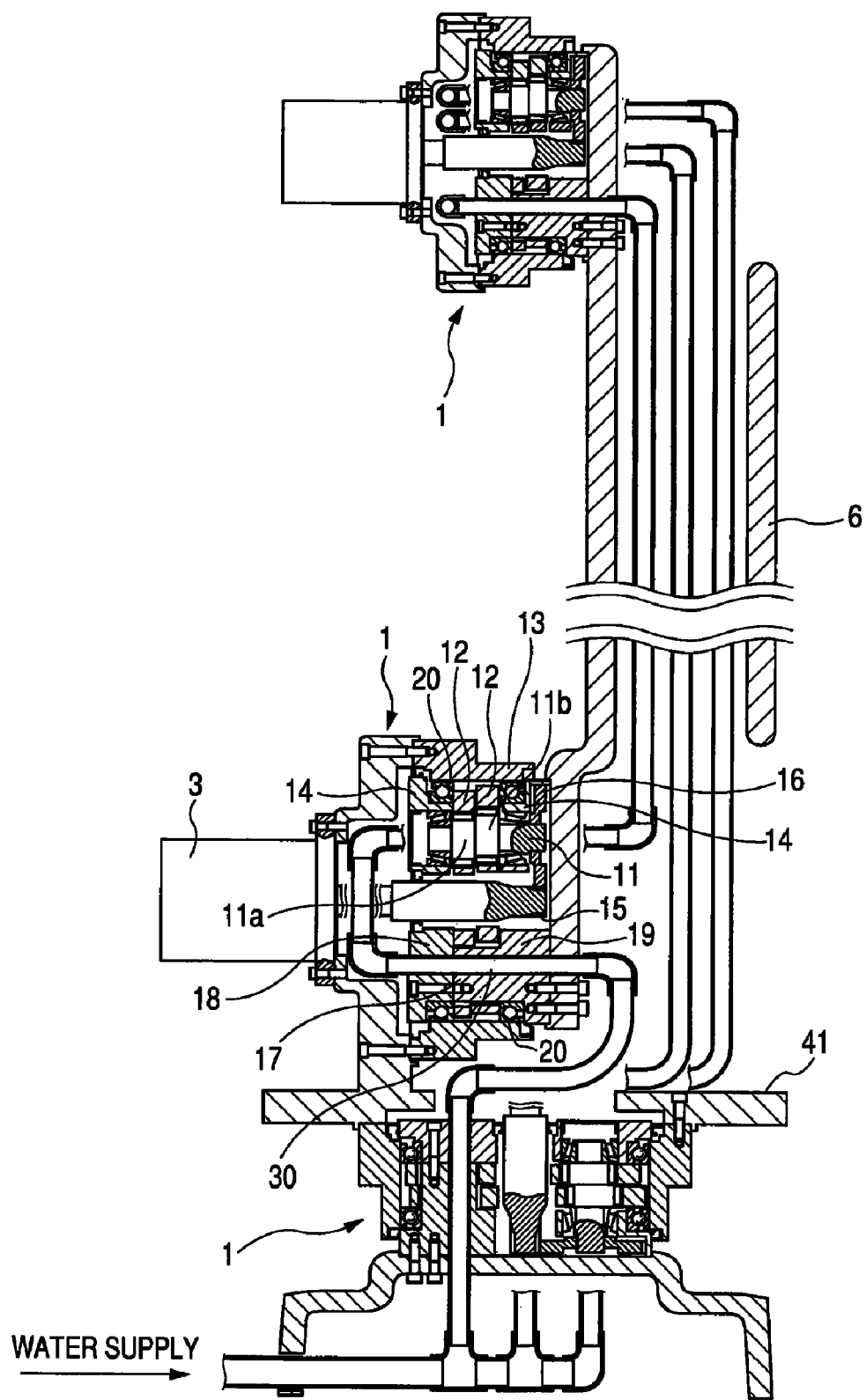
FIG. 1 is a cross-sectional view of piping in speed reducers according to the invention applied to a spot gun robot.

Hereinafter, the invention is described in detail with reference to the accompanying drawings illustrating an embodiment of the invention. FIG. 1 is a cross-sectional view of piping in speed reducers according to the invention applied to a spot gun robot. Although three speed reducers 1 are used in an embodiment illustrated in FIG. 1, the speed reducer 1 illustrated in a central part of FIG. 1 is described in detail hereinbelow.

Each of the speed reducers 1 according to this embodiment is mounted on a base 4 and causes an arm 6 to oscillate. Any of the speed reducers 1 are of the same type. Each of the speed reducers 1 is an eccentric oscillating type speed reducer that includes cam shafts 11, two externally toothed gear members 12, an internally toothed gear member 13, and support members 14.

The support members 14 are positioned at both ends in the axial direction of each of the externally toothed gear members 12 and rotatably support both ends of each of the cam shafts 11 via roller bearings, respectively. The support members 14 are placed in the internally toothed gear member 13. The support members 14 include a pillar portion 17 loosely-fit into a through hole formed between holes each for the cam shaft 11, which are respectively formed in the externally toothed gear members 12, and a pair of circular disks 18 and 19 respectively provided at both ends of the pillar portion 17. The support members 14 rotatably support both ends of the cam shaft 11. The pillar portion 17 is integrally coupled to the pair of disks 18 and 19 with connecting bolts. A coolant passage 30 is passed through a portion into which the pillar portion 17 and the disks 18 and 19 are integrated.

A plurality of (three in this case) cam shafts 11 are arranged at equal intervals on an outer peripheral portion of an input gear 15. Each of the cam shafts 11 has crank portions 11a and 11b. The crank portions 11a and 11b of each of the cam shafts 11 are formed integrally with an associated one of the cam shafts 11. Each of the crank portions 11a and 11b has an eccentricity phase of 180 degrees. A needle bearing is attached to each of the crank portions 11a and 11b. The crank portions 11a and 11b are inserted into the holes formed in the externally toothed gear members 12, respectively.

Each of the externally toothed gear members 12 has a hole for accommodating the crank portions 11a and 11b of an associated one of the cam shafts 11. The rotation of each of the cam shafts 11 enables an associated one of the externally toothed gear members 12. Peritrochoidal tooth profiles are formed on the outer peripheral surfaces of the externally toothed gear members 12. The externally toothed gear members 12 mesh with pins (internal teeth) held in a plurality of semicircular grooves that are formed at equal intervals on the internal periphery of the internally toothed gear member 13.

Internal teeth, the number of which is slightly larger than that of external teeth formed on the outer periphery of each of the externally toothed gear members 12, are formed on the inner peripheral surface of the internally toothed gear member 13. The internal teeth of the internally toothed gear member 13 mesh with the external teeth of each of the externally toothed gear members 12.

Paired main bearings 20 are provided on outer peripheries of a pair of circular disks 18 and 19, respectively, and support the support members 14 rotatably with respect to the internally toothed gear member 13. The main bearings 20 are angular ball bearings and increase stiffness thereof by being provided with a preload when mounted thereon.

An output rotation of a drive motor 3 is transmitted via an input gear 15, which is attached to an output rotation shaft of the drive motor 3, to a transmission gear 16 which is larger than the input gear 15 in the number of teeth. A cam shaft 11 attached to the transmission gear 16 is decelerated and rotated. Then, the rotation is further decelerated by the cam shaft 11, the externally toothed gear member 12, and the internally toothed gear member 13. Incidentally, depending upon a situation, the cam shaft and the external and internally toothed gear members can be adapted to perform an accelerated rotation or an equi-speed rotation, instead of a decelerated rotation.

Thus, a load is put on the speed reducer 1. Consequently, the speed reducer 1 generates heat. In order to prevent the generation of heat, a reduction of a load to be put on the speed reducer 1, or an increase of the capacity of the speed reducer 1 is generally employed as a countermeasure against the generation of heat. However, as described above, any of the countermeasures lead to a cost increase.

According to the invention, attention is focused on the fact that the pillar portion 17 and the pair of circular disks 18 and 19 are integrally connected to one another. The coolant passage 30 is passed through a part in which the pillar portion 17 and the pair of circular disks 18 and 19 are integrally connected to one another. A coolant, such as cooling water or cooling air, is passed through the coolant passage 30. Consequently, the speed reducer 1 in a state, in which a load is put thereon, is cooled.

In this embodiment, cooling water is used as a coolant. Cooling water having been supplied to a bottom stage is passed through the coolant passage 30 provided in the part in which the pillar portion 17 and the pair of circular disks 18 and 19 of the eccentric oscillating type speed reducer 1 provided at the bottom stage are integrally connected to one another. Thus, the cooling water cools the eccentric oscillating type speed reducer 1 provided at the bottom stage. Subsequently, the cooling water going out of the eccentric oscillating type speed reducer 1 provided at the bottom stage is passed through the coolant passage 30 provided in the part in which the pillar portion 17 and the pair of circular disks 18 and 19 of the eccentric oscillating type speed reducer 1 provided at a middle stage are integrally connected to one another. Thus, the cooling water cools the eccentric oscillating type speed reducer 1 provided at the middle stage. Subsequently, the cooling water going out of the eccentric oscillating type speed reducer 1 provided in the middle stage is passed through the coolant passage housed into the atm 6 to the coolant passage 30 provided in the part in which the pillar portion 17 and the pair of circular disks 18 and 19 of the eccentric oscillating type speed reducer 1 provided at a top stage are integrally connected to one another. Thus, the cooling water cools the eccentric oscillating type speed reducer 1 provided at the top stage.

The coolant passage has flexibility against oscillations of the arm 6. Depending upon a situation, the coolant passage can be connected thereto via a rotary joint. Although the coolant passage is housed in the arm 6 in the aforementioned embodiment, the coolant passage can be fixed to the exterior of the arm 6.

As described above, the speed reducer 1 is cooled by the coolant passage 30. Consequently, the generation of heat can be reduced. Even in the case of using the speed reducer 1 whose capacity is equal to that of the conventional speed reducer, a load applied to the speed reducer 1 can be increased, as compared with that applied to the conventional speed reducer. The speed reducer 1 can be operated at lower cost.

Figure 2:
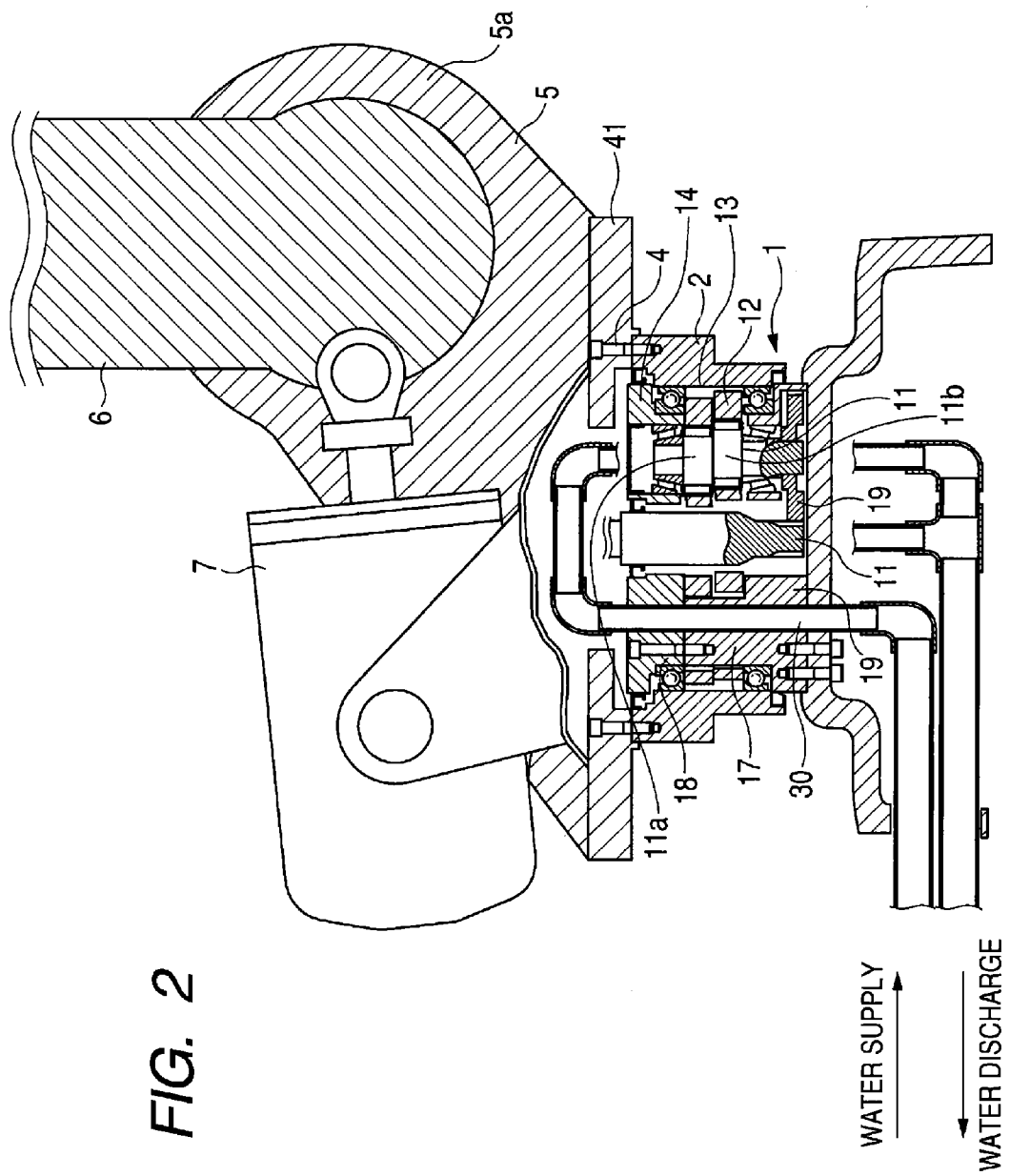
FIG. 2 is a cross-sectional view of a primary part of an embodiment of a multiple joint mechanism of an industrial robot, in which the invention is implemented.

Next, an embodiment of the invention, which is implemented in a multiple joint mechanism of an industrial robot, is described hereinafter with reference to FIG. 2 illustrating a primary cross-sectional view of a primary part of the embodiment obtained by implementing the invention in a multiple joint mechanism of an industrial robot.

As illustrated in FIG. 2, a bracket 2 for mounting a speed reducer is attached with bolts 4 to a base 41 of an industrial robot, such as a spot gun robot, with bolts. In the bracket 2 for mounting a speed reducer, a speed reducer 1 is housed, which has a structure similar to that having been described with reference to FIG. 1. Because the structure of the speed reducer 1 is similar to that having been described with reference to FIG. 1, the same components are designated with the same reference numeral. Thus, the description thereof is omitted.

Similarly to the aforementioned embodiment, a pillar portion 17 and a pair of circular disks 18 and 19 are connected integrally with one another. A coolant passage 30 is passed through a part in which the pillar portion 17 and the circular disks 18 and 19 are connected integrally with one another. Thus, supplied cooling water is passed through the eccentric oscillating type speed reducer 1. Discharged water going out of the eccentric oscillating type speed reducer 1 is circulated and cooled. Thereafter, the cooled water is supplied again as cooling water.

A swivel stand 5 is provided on the base 41. The swivel stand 5 is rotated in a horizontal plane by an output of the speed reducer 1. A pivot portion 5a is provided on the swivel stand 5. The bottom end portion of the arm 6 is supported at the pivot portion 5a oscillatably around a horizontal axis line. The arm 6 is oscillated in a vertical plane by power supplied from an oscillating drive source (not shown). Thus, the multiple junction mechanism according to the invention is constituted.

Another arm, such as a welding arm, (not shown) of a spot gun robot or the like is appropriately connected to the other end portion of the arm 6.

Additionally, a counter balance system 7 of a direct spring balance structure, in which a pushed tension spring (not shown) is stretched, is connected between the bottom end portion of the arm 6 and the swivel stand 5. The vertical arm 6 oscillating on the swivel stand 5 is balanced.

INDUSTRIAL APPLICABILITY

According to the present embodiment, the eccentric oscillating type speed reducer can efficiently be cooled by providing a coolant passage, which penetrates through the integrally coupled support members and through the pillar portion, and passing a coolant such as cooling water or cooling air therethrough. Consequently, even in a case where a speed reducer having the same capacity as that of the conventional one, a load applied to the speed reducer can be increased, as compared with that applied to the conventional one. Thus, the speed reducer according to the invention can be operated at further lower cost.

The invention claimed is:

1. An eccentric oscillating speed reducer comprising:
   a camshaft having crank portions,
   a plurality of externally toothed gear members that respectively have holes, each of which accommodates an associated one of said crank portions, and that are eccentrically moved by rotation of said camshaft,
   an internally toothed gear member having an inner peripheral surface in which internal teeth to be meshed with external teeth formed on external peripheral surfaces of said externally toothed gear members are formed so as to set the number of said internal teeth to be slightly larger than that of said external teeth, and
   support members respectively positioned at both ends of said externally toothed gear members so as to rotatably support both ends of said camshaft so that said support members are integrally coupled to each other via a pillar portion, so that a coolant passage passing through said integrally coupled support members and through said pillar portion is provided.

2. An eccentric oscillating type speed reducer for use in a spot gun robot, said eccentric oscillating speed reducer comprising:
   a camshaft having crank portions,
   a plurality of externally toothed gear members that respectively have holes, each of which accommodates an associated one of said crank portions, and that are eccentrically moved by rotation of said camshaft,
   an internally toothed gear member having an inner peripheral surface in which internal teeth to be meshed with external teeth formed on external peripheral surfaces of said externally toothed gear members are formed so as to set the number of said internal teeth to be slightly larger than that of said external teeth, and
   support members respectively positioned at both ends of said externally toothed gear members so as to rotatably support both ends of said camshaft so that said support members are integrally coupled to each other via a pillar portion, so that a coolant passage passing through said integrally coupled support members and through said pillar portion is provided, and that a coolant for cooling a spot gun is passed through said coolant passage.

* * * * *